Patented Mar. 13, 1923.

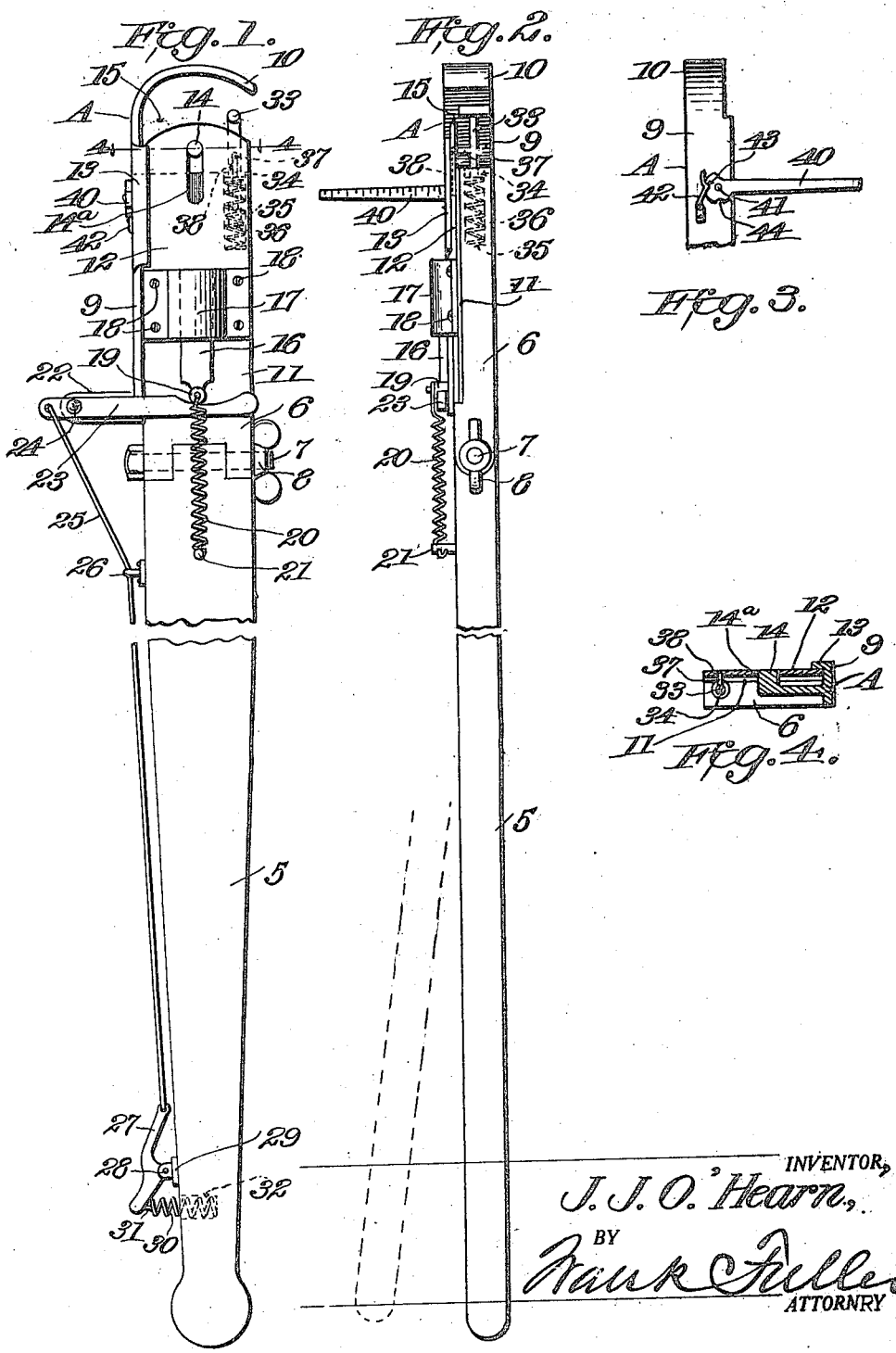

1,448,570

UNITED STATES PATENT OFFICE.

JOHN J. O'HEARN, OF WAPPINGERS FALLS, NEW YORK.

FRUIT AND VEGETABLE CUTTER AND GATHERER.

Application filed February 1, 1921. Serial No. 441,560.

*To all whom it may concern:*

Be it known that JOHN J. O'HEARN, citizen of the United States, residing at Wappingers Falls, in the county of Dutchess and State of New York, has invented certain new and useful Improvements in Fruit and Vegetable Cutters and Gatherers, of which the following is a specification.

My invention relates to a combination fruit and vegetable cutter and gatherer. Among the main objects may be mentioned the provision of such an implement as will cut and gather the fruit and vegetable without injury; one having a slidable knife and a crank operating mechanism therefor; one having a closure means for the gatherer operable after a cutting operation; one made in sections so as to be relatively adjustable to different angles, and to provide the detail construction to be described in connection with accompanying drawings illustrating one preferred embodiment.

In said drawings;

Fig. 1 is an elevation. Fig. 2 is a side view. Fig. 3 is a fragmentary view of the opposite side and Fig. 4 is a detail sectional view on line 4, 4 of Fig. 1.

Referring specifically to the drawings wherein like characters of reference designate like or corresponding parts, a staff or bar is provided composed of wooden or other sections 5 and 6 which are pivotally connected by a bolt 7 whose head bears against one side edge and whose nut as at 8 bears against the other. This nut is preferably winged to facilitate manipulation. By means of this construction the staff is adjustable so that the cutting mechanism may be disposed at different angles to the work according to the will of the operator.

At one end of section 6, a bracket A is disposed having a bar 9 which is suitably fastened to one side of the section 6 and is formed into a hook or confining wall 10 spaced from the adjacent end of section 6 and open at one end as shown. A metallic bed or bearing plate 11 is preferably fastened to the top of section 6 and a cutting blade 12 is adapted to slide thereon relatively to the hook 10. Blade 12 is overlapped by a flange 13 of the bar 9 and it is positioned and its movement limited by reason of a pin or stud 14, which may extend from section 6, entering an elongated slot 14ᵃ of the blade. The cutting edge is at 15. Extending from blade 12 is a shank 16 which slides in a bearing 17 screwed to section 6 at 18. At the rear end of shank 16, a stud 19 is provided. A coil spring 20 is secured to section 5. This spring is tensioned to retract the blade 12 and normally maintain its rear edge in contact with bearing 17, which thus serves as a stop for the blade.

To a lug 22 extending from bar 9, a crank or lever 23 is pivoted at 24 and it normally bears against the stud 19. Connected loosely to the outer end of the lever is a wire or flexible element 25. Wire 25 passes through a guide eyelet 26 on section 5 and is loosely fastened to an operating lever 27 pivoted at 28 to a bracket 29 on section 5. A spring 30 normally urges the handle end of lever 27 away from section 5 to maintain crank 23 in engagement with stud 19. Spring 30 is positioned by a pin 31 of lever 27 extending thereinto and by its disposition in a slot 32 of section 5.

A closure for the open end of the hook is provided having a rod 33 provided with a head 34 slidably mounted in a recess 35. In said recess, a coil spring 36 is mounted to urge the closure toward the hook. Rising from rod 33 is a pin or detent 37 which enters an elongated slot 38 undercut in blade 12. The shape of slot 38 is such that the closure cannot close the hook end when blade 12 is retracted but does close it when the blade is projected and also when the blade is projected may be retracted independently of the blade to remove gathered fruit or vegetables.

At 40, a measuring staff is provided preferably having suitable indications thereon as shown to enable material where possible to cut the same length, for instance asparagus. This staff is pivoted to bar 9 at 41, and may be held raised by a spring 42 clipped into a notch 43 on the staff. The staff may also be lowered when not in use and held in such position by the spring 42 clipping into a notch 44 of the staff.

When vegetables or fruit are to be harvested, sections 5 and 6 are disposed at the angle desired by the operator through adjustment at bolt 7 and nut 8. The implement is held so that blade 12 is at the bottom. Then the article is surrounded by the hook 10 and blade 12 and lever 27 at the handle end pressed against section 5, resulting in cable 25 moving crank 23 against stud 19, forcing the blade 12 toward the hook so that cutting edge 15 will shear or cut off the article and the blade 12 will retain the cut article. When the blade moves outwardly, the closure 33 also moves outwardly to engage the hook and close the entrance thereto. Should it be desired to remove the article before the lever 27 is released and blade 12 retracted closure 33 may be retracted independently of blade 12 against the tension of spring 36. When lever 27 is released, spring 20 assisted by spring 30, will restore the blade and associated parts to normal position.

As merely the preferred embodiment has been illustrated and described, it is to be understood that changes in the details may be resorted to within the spirit and scope of the invention as defined by the appended claims.

I claim:—

1. A gathering implement including a retaining means for the article to be gathered, a cutting member movable relatively to said means, means to close the entrance to the retaining means and means to retract the second mentioned means independently of the member.

2. A gathering implement including a retaining means for the article to be gathered, a cutting member movable relatively to said means, a means to close the entrance to the retaining means, said means being retractile independently of the cutting member and said member serving to normally maintain the retaining means retracted.

3. A gathering implement including a retaining means for the article to be gathered, a cutting member movable relatively to said means, means to slide the cutting member, a closure member for the entrance to the retaining means, one of said members having a slot and the other extending thereinto, means to normally project one of said members and means to normally retract the other member.

4. A gathering implement including a retaining means for the article to be gathered, a cutting member movable relatively to said means, means to slide said member, means to limit the movement of said member, said member having slot, a closure member for the entrance to the retaining means said closure member having a lug extending into said slot, and means to project the closure member.

5. A gathering implement including a staff, a bar secured to the staff and having a hook opposite one end thereof, a cutter slidable on the staff, a flange on the bar overlapping the cutter, a pin extending from the bar, said cutter having an elongated slot into which the pin extends, a closure for the open end of the hook, said cutter having means to detain the closure member, means to project the closure member, a shank on the cutter, a bearing for the shank; a return spring secured to the shank and staff, a crank pivoted to the bar and bearing against the shank, and a draw mechanism for the crank.

In testimony whereof I affix my signature.

JOHN J. O'HEARN.